United States Patent Office.

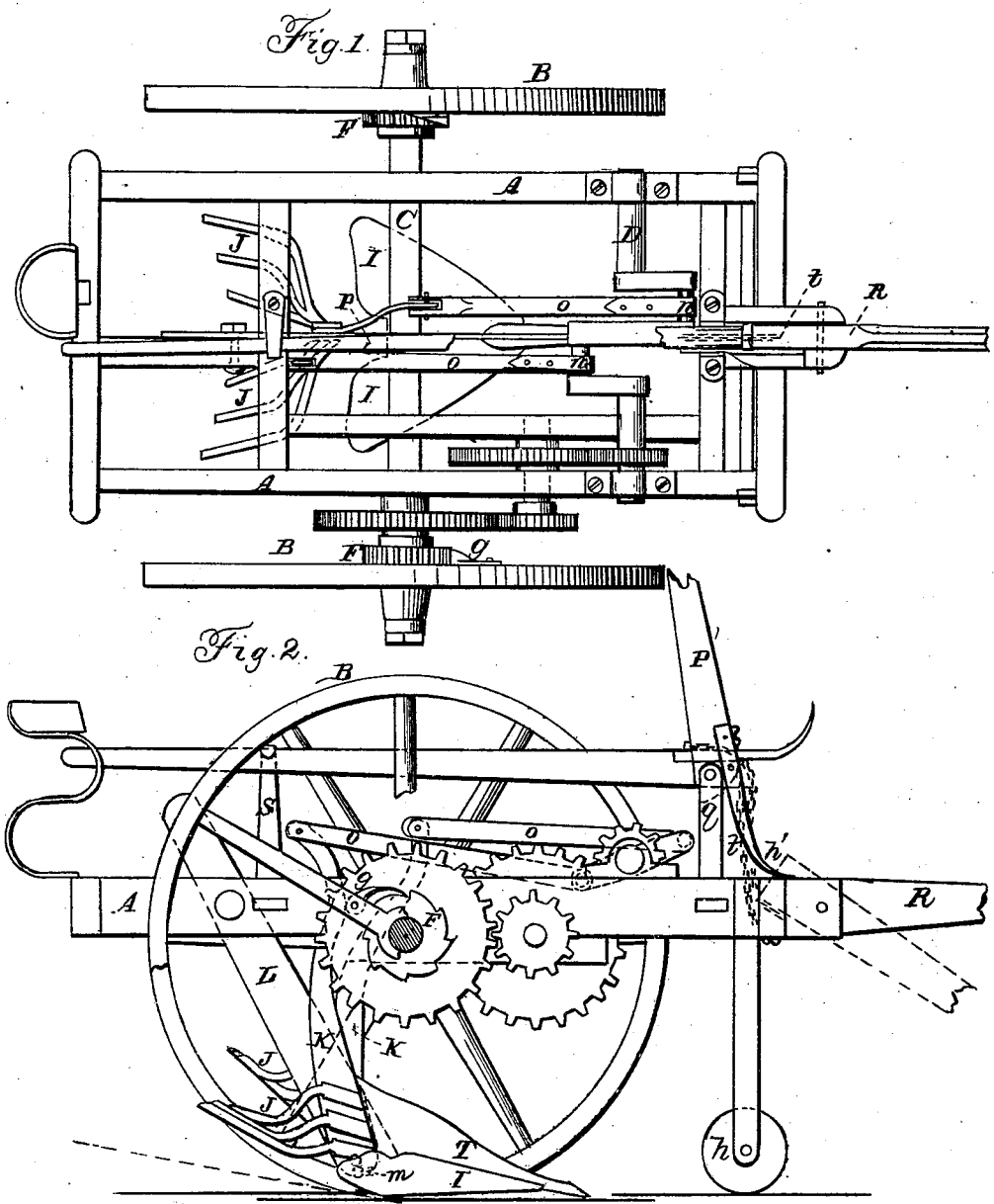

BENJAMIN D. VANDERVEER AND DANIEL RIDDEL, OF FREEHOLD, NEW JERSEY.

Letters Patent No. 81,230, dated August 18, 1868.

IMPROVEMENT IN POTATO-DIGGERS.

The Schedule referred to in these Letters Patent and making part of the same.

TO ALL WHOM IT MAY CONCERN:

Be it known that we, BENJAMIN D. VANDERVEER and DANIEL RIDDEL, of Freehold, in the county of Monmouth, and State of New Jersey, have invented a new and improved Potato-Digger; and we do hereby declare that the following is a full, clear, and exact description thereof, which will enable those skilled in the art to make and use the same, reference being had to the accompanying drawings, forming part of this specification.

This invention relates to a machine for digging potatoes, whereby the labor and time usually expended on that process are greatly reduced; and the invention consists in the arrangement of a plowshare to raise the potatoes from the ground, and shakers, for separating them from the soil, and in a device for clearing the machine of vines, and in the general construction and arrangement of parts, as will be hereinafter more fully described.

Figure 1 represents a plan view of the machine, showing the different parts in their proper positions.

Figure 2 is a side elevation of the machine, with the driving-wheel broken away, in order to show the parts to better advantage.

Similar letters of reference indicate corresponding parts.

This machine consists of a suitably-constructed frame, A, supported on two wheels, B, by an axle, C.

The machine is drawn by one or more horses, and the horizontal driving-crank shaft D is revolved by a succession of gear-wheels from the axle, as seen in the drawing.

The wheels turn freely on the axle, but there are ratchet-wheels, F, on the axle, and pawls, $g$, attached to the wheels, so that the axle is revolved when the machine is moving forward, but does not revolve on a backward motion.

The forward part of the machine rests on a traversing-wheel, $h$, which passes over the row of potatoes in advance of the plow, when the machine is in operation.

I is the plow or share, (something in the form of the ordinary shovel-plow,) which passes under the potato-hills or rows, and raises the potatoes and the earth, which slide back over the wings of the plow and on to the shakers J J.

These shakers are placed on each side of the plow-standard, formed of wire prongs, and are, in fact, an open continuation of the mould-boards or wings of the plow.

The prongs are securely fastened to upright bars, $k\ k$, which are attached to the plow-standard L by a jointed connection, as seen at $m$, fig. 2.

These bars pitch forward from the plow-standard, so that the potato-vines are caught by them and cleared from the standard by the oscillating alternate motion which is imparted to them by the cranks $n\ n$, on the shaft D.

$o\ o$ represent connecting-rods, which are attached to the bars and to the cranks, the motion of which is imparted to the shakers J, which effectually shake the earth from the potatoes, and leave them on the surface of the ground, ready for picking.

By the alternate rapid motion of the upright bars $k\ k$, the vines which come in contact with them are worked off on each side, so that they form no obstruction to the movement of the plow through the soil.

For the purpose of raising the plow from the ground, when turning the machine round, or when going to or from the field, there is a lever, P, which has its fulcrum on a stand, $q$, on the frame.

The end of this lever P is connected to the end of the tongue or pole, R, of the machine by means of a chain, $t$, as seen more clearly in fig. 2.

The back end of the lever is within reach of the driver.

The outer end of the pole R is confined in the neck-yoke of the harness, or otherwise supported.

It will be seen that, by drawing down the long end of the lever P, the front end of the machine will be elevated, and the plow and traversing-wheel $h$ will be raised clear of the ground.

As seen in the drawing, fig. 2, the lever P is elevated, as when the machine is at work.

The lever and the pole or tongue R are seen in red, as when the front end is elevated.

There is a spring, $p'$, on the end of the lever P, which, when the lever is elevated, as seen in the drawing, bears upon the hound, in which is secured the tongue R, and prevents the lever from falling forward.

The driver's seat is also seen in red, at the rear end of the machine.

S is a standing hook, for fastening the lever down when the machine is elevated.

Over the centre of the plow, and connected therewith, there is point, T, which slopes back and upward to and between the oscillating-bars k k, something in the form of a coulter plowshare, as seen in the drawing.

By the use of this machine, the laborious process of digging potatoes is rendered easy and agreeable, while the potatoes are left on the surface of the ground, in much better condition than when they are dug by hand in the usual manner.

We are aware of the patent of G. Ray, dated August 28, 1866, for a potato-digger, in which the front part of the machine is adapted to be raised by means of a lever, but as this lever is not constructed and arranged like ours, not connected to the frame in the same manner, and is provided with no spring, it forms no part of our invention; therefore we do not wish to claim it.

We claim as new, and desire to secure by Letters Patent—

1. In combination with a plow or plowshare of any construction, when used for the purpose described, the shakers J J and the vine-clearers or bars k k, arranged substantially as described, for the purposes specified.

2. In combination with the shakers J, the double crank-shaft D, connecting-rods O, and gearing, whereby motion is communicated from the axle to the crank-shaft, all arranged to operate substantially as herein shown and described.

3. The lever P, when connected directly with the pole R, by means of the chain $t$, and provided with the spring $p'$, adapted to rest upon the hounds, to prevent the lever P from falling forward, all constructed and arranged to operate as herein shown and described.

The above specification of our invention signed by us, this 21st day of April, 1868.

BENJAMIN D. VANDERVEER,
DANIEL RIDDEL.

Witnesses:
Wm. F. McNamara,
Alex. F. Roberts.